Feb. 7, 1967  G. E. MALLINCKRODT  3,303,097

HIGH-PRESSURE AND-TEMPERATURE GENERATOR

Filed Aug. 20, 1965  6 Sheets-Sheet 1

George E. Mallinckrodt, Inventor.
Koenig, Senniger, Powers and Leavitt, Attorneys.

Feb. 7, 1967  G. E. MALLINCKRODT  3,303,097
HIGH-PRESSURE AND-TEMPERATURE GENERATOR
Filed Aug. 20, 1965  6 Sheets-Sheet 2

Feb. 7, 1967  G. E. MALLINCKRODT  3,303,097
HIGH-PRESSURE AND-TEMPERATURE GENERATOR
Filed Aug. 20, 1965  6 Sheets-Sheet 3
FIG. 7.
FIG. 8.
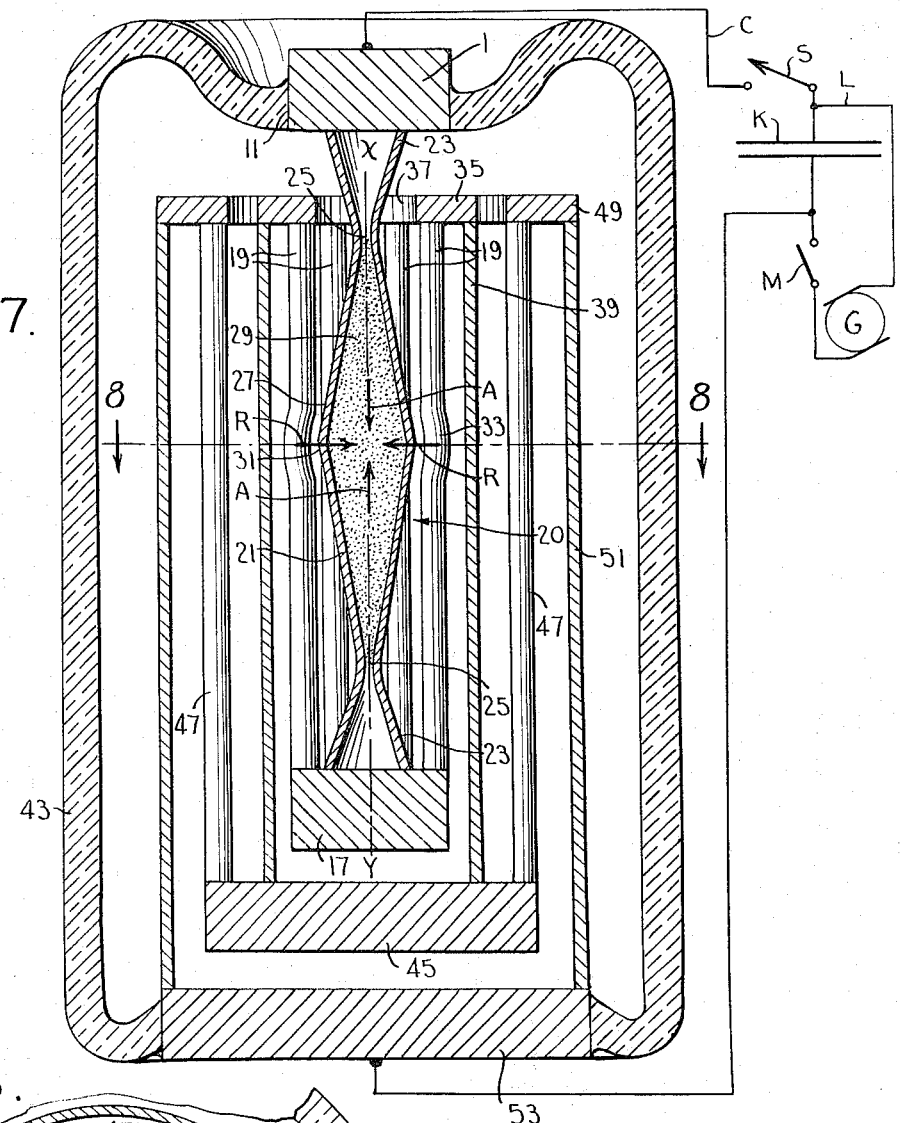
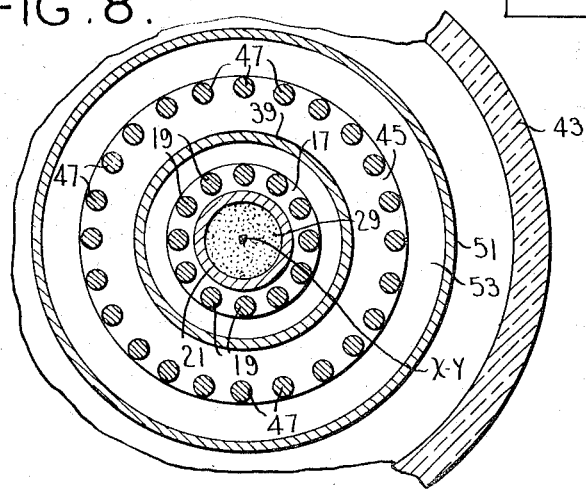

United States Patent Office 3,303,097
Patented Feb. 7, 1967

3,303,097
HIGH-PRESSURE AND -TEMPERATURE GENERATOR
George E. Mallinckrodt, 20 Kingsbury Place, St. Louis, Mo. 63112
Filed Aug. 20, 1965, Ser. No. 481,246
38 Claims. (Cl. 176—1)

This application is a continuation-in-part of my United States patent application, Serial No. 418,969, filed December 17, 1964, for High-Pressure and -Temperature Generator, now abandoned.

This invention relates to generators of high pressures and temperatures, and with regard to certain more specific features, to highly stable generators of this type useful in experimental and other processes requiring ultra-high pressures, temperatures, and in some cases various forms of radiation, the invention being an improvement upon apparatus such as shown in my United States Patent 3,107,211.

The invention accordingly comprises the elements and combinations of elements, features of construction, and arrangements of parts which will be exemplified in the constructions hereinafter described, and the scope of which will be indicated in the following claims.

In the accompanying drawings, in which several of various possible embodiments of the invention are diagrammatically illustrated:

FIG. 7 is a view similar to FIG. 1, showing a third form of the apparatus;

FIG. 8 is a cross section taken on line 8—8 of FIG. 7;

Corresponding reference characters indicate corresponding parts throughout the several views of the drawings.

By appropriate means herein described, reactions may be obtained from various materials, which may be referred to as fuel, accompanied by ultra-high pressures and -temperatures in the materials. Various forms of radiation may also be obtained which are useful not only in experimental studies of the materials themselves but also in the treatment and studies of other materials.

Hereinafter, reference to metals includes appropriate alloys thereof.

Figure 1:
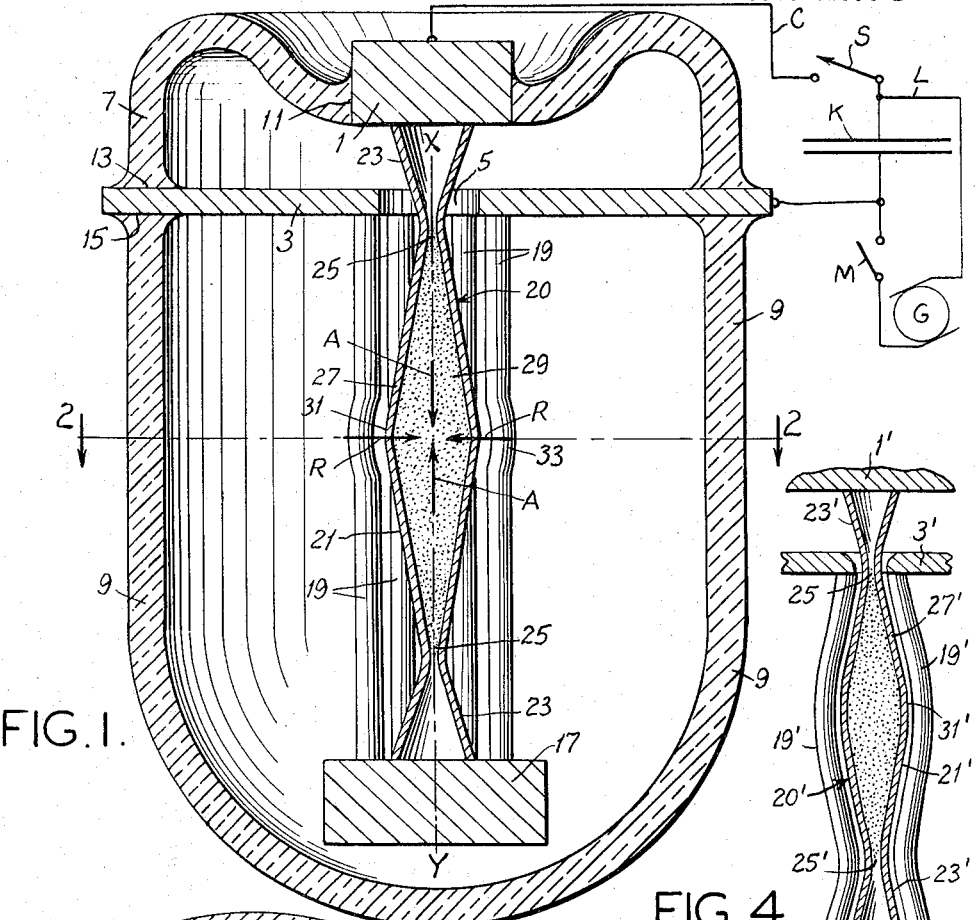
FIG. 1 is an enlarged diagrammatic axial section of one form of apparatus for carrying out the invention, certain circuit portions also being shown diagrammatically.
Figures 2, 3:
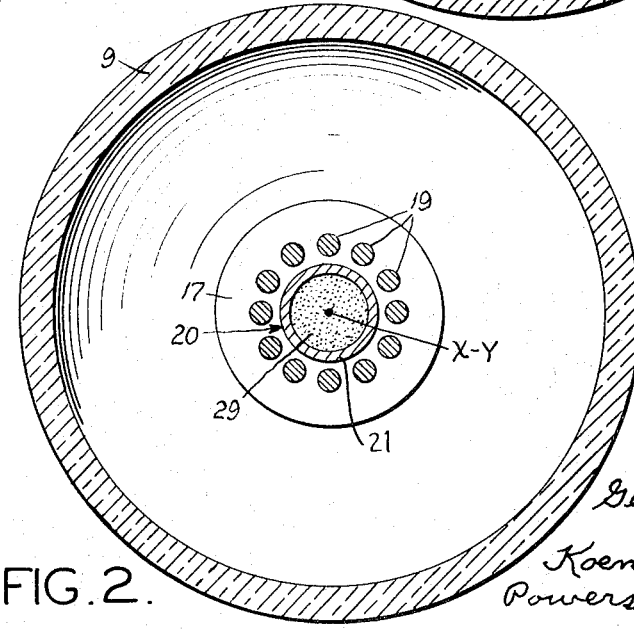
FIG. 2 is a cross section taken on line 2—2 of FIG. 1.
FIG. 3 is a fragmentary cross section similar to FIG. 2 but showing an alternative arrangement of certain parts.

Referring now more particularly to FIGS. 1 and 2 of the drawings, X–Y is an axis or straight line of symmetry. Numerals 1 and 3 indicate highly conductive terminals of the device. These are preferably circular and symmetrical around axis X–Y. Terminal 3 contains a central hole 5. A preferably symmetrical envelope is established by insulating container elements 7 and 9, composed of glass, quartz or the like. In the case of glass, it is preferable that the terminals 1 and 3 be composed of the alloy Kovar, which has a coefficient of thermal expansion substantially equal to that of glass, so that in known manner effective glass-to-metal seals may be formed over circular areas 11, 13 and 15. Kovar consists of approximately 29% nickel, 17% cobalt, up to 0.2% manganese and the balance iron. In the case of some other materials used for members 7 and 9, the terminals 1, 3 may be composed of other metals such as copper, gold, silver or the like.

At numeral 17 is shown a conductive connection in the form of a symmetrical circular block which may be composed of copper, gold, silver or the like. This is supported from the conductor 3 by a close circular array of a substantial number (not less than three and preferably five or more) of substantially identical discrete highly conductive circular rods or wires 19, composed of gold, silver, copper or the like. Gold is preferred. Twelve rods 19 are shown in FIGS. 1 and 2. These are equally closely spaced from one another and symmetrically and equiangularly disposed around the central axis X–Y. The conductors 19 form what may be called a cage within which is concentrically located a symmetrically shaped fuel element 20 in the form of a shell having integrated sections 21, 27 meeting at a mid portion to form a central enlargement 31. The resulting axial section is diamond-shaped in FIG. 1, terminated by flaring portions 23. Shells 21, 27 may be composed of glass or a suitable plastic such as Teflon, and is preferably coated on one or both sides with a vapor-deposited thin film of material such as lithium or beryllium metal. These metals minimize Brehmstrahlen. The purpose of the film is to equalize distribution of electrical surface charges on the shells 21, 27. The shells 21, 27 may also be composed of a heavyweight element such as gold, copper, or silver, or a lightweight element such as beryllium, magnesium or the like. For some purposes gold is preferred, as will appear below. The opposite ends of the shells 21, 27 are sealed to the conductive members 1 and 17. The shape of shells 21, 27 comprises constrictions 25 between its flaring portions 23 and the central enlarged portion 31. The form of the entire fuel element 20 is symmetrical around axis X–Y. It is infilled with a suitable fuel-forming material 29, composed, for example, of lithium hydride (i.e., lithium deuteride with 1% to 10% by weight, inclusive, of lithium triteride). This material may be in the form of a solid, or composed of a half-and-half mixture by weight of these substances in crystalline or powder form. Or, the shells 21, 27 may be infilled with a half-and-half mixture by volume of tritium and deuterium gases, under a pressure ranging from 100 to 100,000 p.s.i., and sealed at constrictions 25.

The outside diameter of the fuel element 20 at its largest or waist portion 31 may be on the order of $\frac{1}{8}$ inch O.D. and its wall thickness on the order of $\frac{1}{64}$ inch. The rods or wires 19 may be on the order of $\frac{3}{16}$ inch O.D. The radial distances of the rods or wires 19 from the center line X–Y are minimized, and are bowed outwardly to clear said waist, as shown at 33. This is to avoid their touching the waist 31 of the shell 21. Dimensions are subject to some variation but a maximum amount of miniaturization is desirable for producing maximum pressures and temperatures. In any event important features of the invention reside in the related geometric forms of the current-carrying components. The entire space contained by members 1, 7, 9 may be evacuated to a high vacuum as illustrated in the drawings, or infilled with a cast plastic such as Teflon, compressed magnesium oxide powder, water, or air at a high pressure of many atmospheres. Low air pressures are undesirable such as atmospheric pressure or a poor vacuum. Teflon is a tetrafluoroethylene polymer. Another suitable insulating infilling is zirconium oxide powder which has a high density and a high melting point. It has an additional advantage in that it may be conveniently tamped into position when the powder is wetted with silicone oil.

In FIG. 3 is shown a modified form of the conductor rods or wires 19. In this case, instead of being of circular cross section, as in FIGS. 1 and 2, they are of ribbon-like form, as indicated at 19A, their planes being radially disposed and including the center line X–Y. This shape of the rods permits their closer spacing and the use of a greater number.

Figure 4:
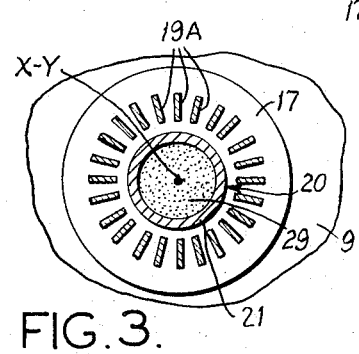
FIG. 4 is a fragmentary axial section showing another alternative arrangement of certain parts.

In FIG. 4 is shown a form of the invention in which like primed numbers illustrate parts analogous to those shown in FIG. 1. In this case the symmetrical fuel element 20' is of curved shape to form the bulge 31' and the rods 19' are radially formed more closely to follow the outer form of shell 20'.

It will be understood, as regards all forms of the invention shown in FIGS. 1–4, that the rods in each group, such as 19, 19A, or 19', have identical forms but have no spiral component of direction around axis X–Y, which is to say that they lie in equiangularly spaced planes containing or intersecting on axis X–Y.

At C is shown a circuit connected across the terminals 1 and 3. This contains a suitable capacitance in the form of a capacitor or condenser K and also a switch S. At G is shown a generator with a suitable circuit L for charging the condenser K. In the circuit L is a switch M for disconnecting the generator when the condenser K is discharged through switch S. The condenser K should be of high capacity, as for example, $10^{-5}$ to $10^{-4}$ farads. The generator is adapted to charge the condenser at high voltage, for example, on the order of 200 to 500 kv. These values are to be taken as suggestive and not limiting, inasmuch as variations are permissible.

Operation is as follows, referring to FIGS. 1–4:

Switch M is closed and generator G is operated to charge the capacitor K (switch S open). Then switch M is opened and switch S closed, whereupon the capacitor discharges a heavy surge of current through terminal 1 in one axial direction through fuel element 20, block 17, and serially in reverse axial directions through the parallel-connected, non-helical rods or wires 19. The conductive rods or wires 19 and the fuel element 20 immediately vaporize and each converts to a conductive plasma. The magnetic field associated with the shell 21, 27 and its fuel 29 will exert a basic strong radial pinch effect on the fuel. The current directions through the conductive rods 19 and their initial plasma paths are all the same and are in electrical parallel, whereas the current direction through the fuel element 20 and its initial plasma path is opposite thereto. The parallel currents through the rods 19 initiate magnetic fields around the respective rods and their plasmas. These are self-cancelling between their parallel paths. Hence these paths tend to be drawn together. As a result, the plasmas of the rods 19 will be forced radially inward toward the center line X–Y, so as to accommodate this approach.

The opposite flow of current through the fuel element 20 forms one leg of each of a series of radially disposed spatial loops. The other leg of each loop is a rod 19. Each current loop is formed exclusively in a radial plane, being formed by the serial flow of current established through the fuel element 20 and a nonhelical rod 19. The magnetic fields surrounding the two legs of each loop reinforce one another between the legs, thus tending by action and reaction in all loops to exert an auxiliary inwardly directed stabilizing pinch effect on the plasma of the fuel element 20. The result is a rise to high values. The direction of the radial compression in one plane is arbitrarily indicated in FIG. 1 by the arrows R. The symmetrical disposition of the auxiliary radial forces constrictive around the center line X–Y is to provide stability to the pinch effect on the plasma of the fuel 29.

The bulged cross section of shell 21, 27 has the effect of producing what are sometimes called shaped charges which, as reaction takes place in the plasma, causes an axially disposed compressive force arbitrarily indicated by the arrows A in FIG. 1. Any electrons which boil off from the inner surface of the shell 21, 27 tend to separate the plasma formed by the fuel 29 from the inner walls of 21, 27 additionally compressing the fuel plasma. With sufficient capacity and voltage from the capacitor K there will be produced not only ultra-high pressures and temperatures, but also various forms of radiation which are useful in various physical experimental and other processes known to those skilled in the art.

It will be understood that the pinch effect from the low-impedance radial loop circuits constituted by the fuel element and the rods confines or bottles the tendency to expansion of fuel plasma that might otherwise occur. Consequently, compression is maintained to highly heat the contents of the fuel element 20 to a point at which energy-releasing transformations will occur in the fuel.

The apparatus has advantages over that shown in my above-mentioned Patent 3,107,211 in that first, the current in the fuel element 20 and its plasma flows oppositely and in low-impedance looped series with symmetrically disposed currents flowing in the parallel-connected conductors 19 and their plasmas, rather than parallel therewith and in the same direction.

In other words, each rod 19 may be regarded as a non-helical circuit leg. With the fuel element 20 as the other leg, a current loop is formed. If the current through the fuel elements wavers from the straight line X–Y, as in the case of the formation of a kink toward a circuit rod 19, a larger current is induced to flow in the loop of which that rod forms one leg and smaller currents in the loops formed by the fuel element and the other rods 19. The resulting increased action and reaction between the legs of the loop carrying the larger current, and the smaller reactions between the legs of the other loops carrying less current, drive the kink back toward the axis X–Y.

It will be understood that the entire apparatus will be consumed in the process of discharge and that the effects produced are transitory, but such transient effects are useful in experimentation calling for high-pressure and -temperature effects accompanied, if desired, by various forms of radiation. As above indicated, it is desirable that in practice the apparatus be miniaturized as much as possible. In this connection it is to be understood that the drawings are diagrammatic. Preferably critical part sizes should be no larger or not much larger than as indicated herein. In general, the number of rods or wires 19, 19A or 19' is to be maximized to minimize compression losses through the spaces between them.

It is also to be understood that in cases where the enlarged waist portion 31 of the fuel element 20 is reduced, or entirely eliminated, by making the mid portion of the fuel element cylindrical, the rods or wires may be positioned closer to the center line X–Y without the need for curved portions such as 33. While the use of a cylindrical form of fuel element does not have the shaped charge effect above described, this is not necessary in all cases. In the FIG. 4 form of the invention, closeness between the rods and the entire length of the shell is obtained, while still retaining the bulged form of the fuel-containing shell 21', 27'.

In many nuclear temperature and pressure experiments it is desirable to minimize contamination of the fuel such as 29. In such cases it is desirable to have both the rods such as 19 and the containing shell such as 21, 27 composed of gold. Gold has a high atomic number, whereas the fuel 29 in general has a low atomic number. Consequently the gold acts as a tamper to drive the material of the fuel into a state of compression, with minimum intermixing of the fuel and the tamper material (gold). However, in the instance where longer containment of the fuel under pressure is desired, with possibly less pressure engendered, it may be desirable to use the glass form of the shell 21, 27 as above mentioned, with or without a coating of conductive material such as above described.

Figure 5:
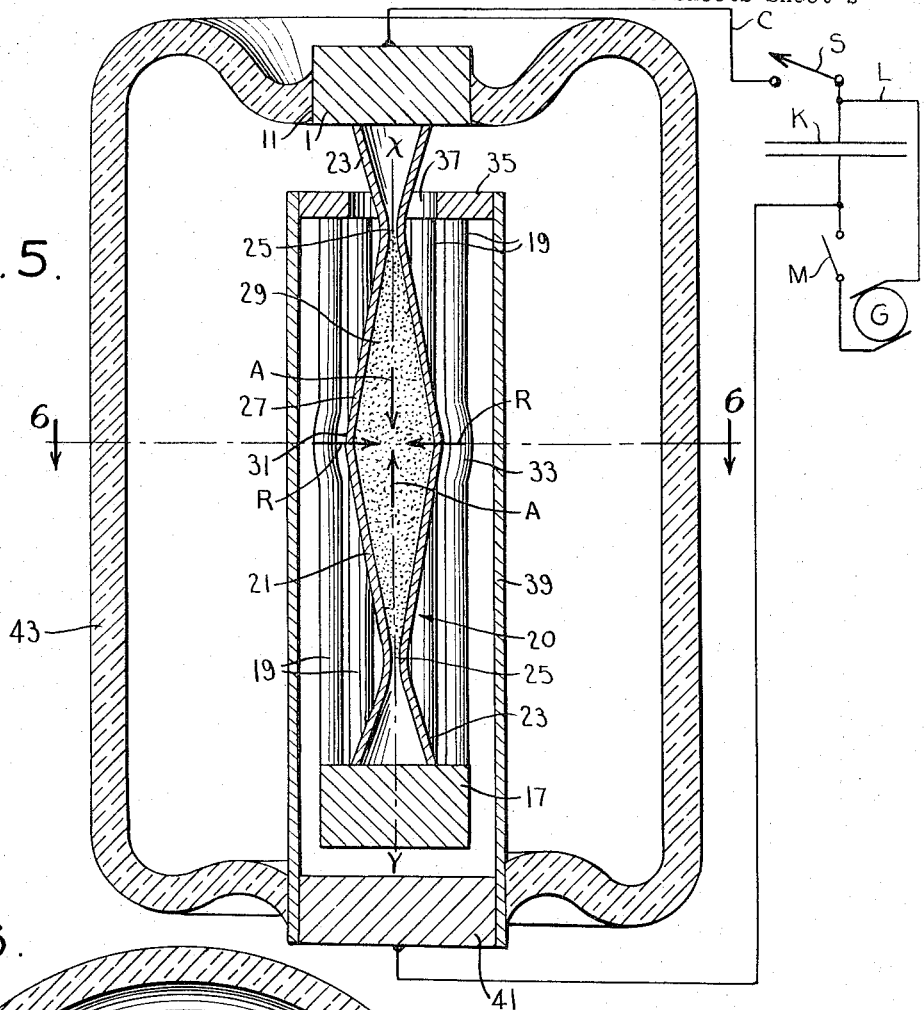
FIG. 5 is a view similar to FIG. 1, showing a second form of the apparatus.
Figure 6:
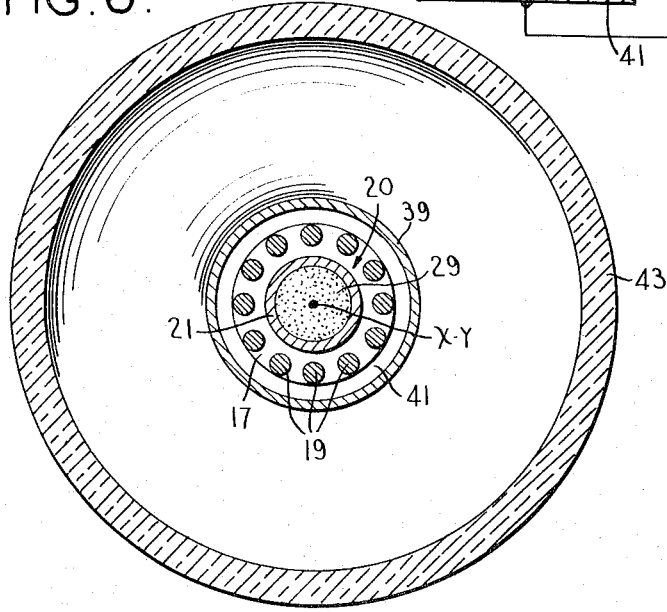
FIG. 6 is a cross section taken on line 6—6 of FIG. 5.

In FIGS. 5 and 6 is shown another form of the invention in which like numerals designate like parts. In this case the fuel element 20 (like that of FIG. 1) extends between a terminal 1 and a conductive disc 17. Conductive rods or wires 19 are connected to the disc 17. The latter lead up into connection with a conductive ring 35 in which is a hole 37 surrounding the upper end of the fuel element 20. Connected with the ring 35 is a symmetrical conductive sleeve 39 which may be composed of copper, gold, silver or the like. This sleeve surrounds the rods 19 and extends downwardly, where it is connected interiorly with a conductive terminal 41. A glass, quartz or like envelope 43 connects terminal 1 with the lower end of the tube 39, the same being effected or infilled in the manner described in connection with FIG. 1. The outside circuitry between terminals 1 and 41 is the same as that between terminals 1 and 3 of FIG. 1.

Upon discharge of the condenser K (FIG. 5), current flows, for example, down through the fuel element 20, up through rods 19 and then down through the conductive tube 39, with low impedance. The pinch action between the fuel element 20 and rods 19 is such as has already been described above in connection with FIG. 1. In addition, there will be formed other radially disposed loops of oppositely flowing currents through the respective rods 19 and the tube 39. These again constitute low-impedance circuits. Repulsion force will build up between rods 19 and tube 39. The resulting peripheral magnetic field around the tube 39 will exert a pinch effect directed inwardly toward axis X–Y. This pinch effect will be in addition to those exerted by fuel container (21, 27) and by the rods 19 on the fuel element 20. The tube 39 not only provides a convenient low-impedance coaxial flow of current around the rods 19, but also has value as an inward reflector of radiation toward the fuel element 20. Again, the symmetrically bulged form of the fuel element 29 focuses compression, as shown by the arrows A and R.

In FIG. 7 is shown a further variation of the invention in which like numerals designate like parts. In this case the tube 39 terminates at its lower end in an additional conductive disc 45 from which extend upwardly directed rods 47 terminating in connection with an additional conductive ring 49. Connected with the ring 49 exteriorly of the rods 47 is a second conductive tube 51 which extends downwardly into conductive connection with a conductive terminal 53. The materials of these elements are as above described in connection with the rods, tubes and terminals, etc., of FIG. 5. In this case current flows, for example, down through the fuel element 20, up through rods 19, into ring 35, down through tube 39, up through rods 47 into ring 49 and down through tube 51. The rods 47 are again symmetrically arranged in close array around tube 39, thus bringing about the same type of repulsion forces between them and tube 39 as above described between the rods 19 and fuel element 20. Repulsion forces also occur between rods 47 and tube 51. Also, there exists the same type of pinch effect between the outer tube 51 and the outer rods 47 as described between the inner tube 39 and the inner rods 19, it being apparent that there will be a peripheral magnetic field surrounding tube 51, just as there is a peripheral magnetic field surrounding tube 39.

In view of the above description of FIGS. 5–8, it will be apparent that the number of arrays of rods such as 19 and 47, and the number of tubes such as 39 and 51, may be increased indefinitely by use of additional conductor discs such as 45 and rings such as 35 and 49. Operation of the FIG. 7 form of the invention will be apparent from what has already been described as regards operation of the forms of the invention shown in FIGS. 1 and 5.

Figure 9:
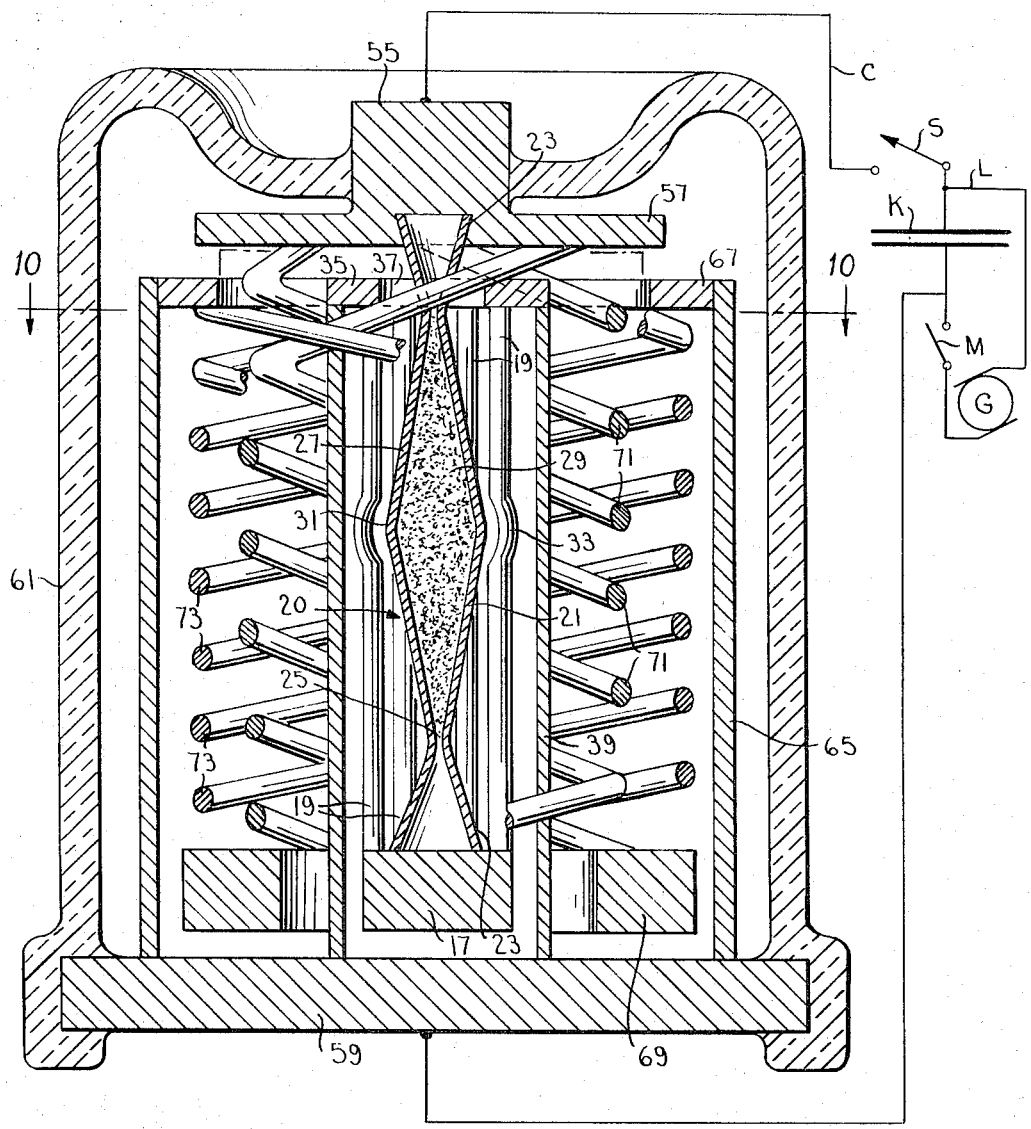
FIG. 9 is a view similar to FIG. 1, showing a fourth form of the apparatus.
Figure 10:
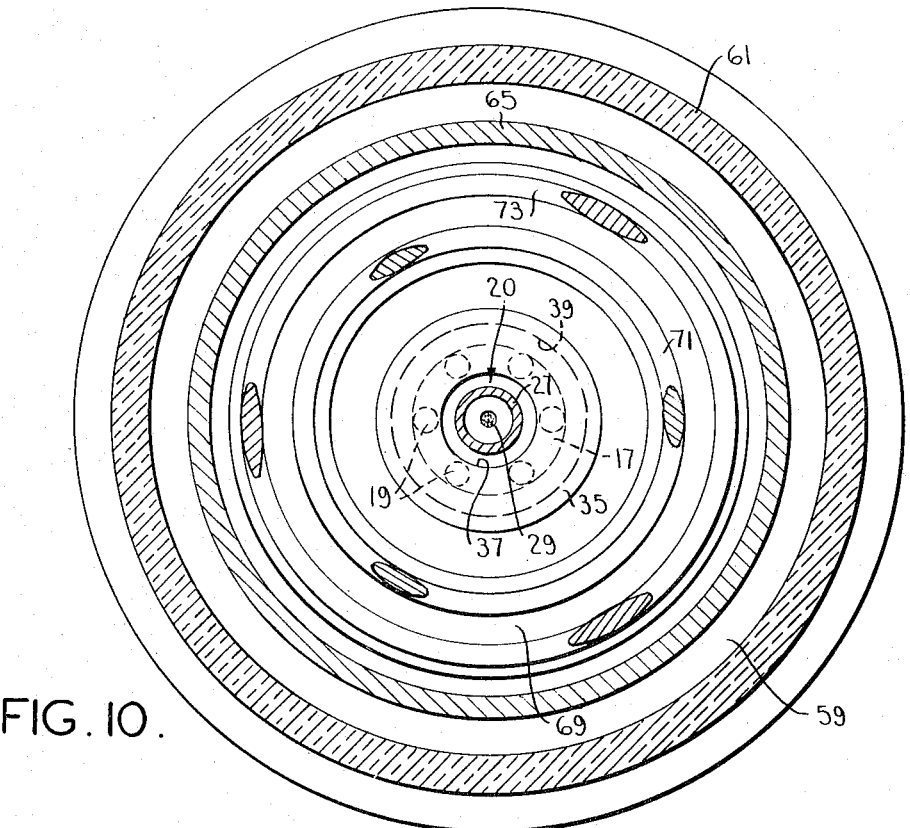
FIG. 10 is a cross section taken on line 10—10 of FIG. 9.

In FIGS. 9 and 10 is shown another form of the invention, in which there is employed not only the radial repulsion and pinch principles of FIGS. 1 to 7, but in addition a squeezing effect by certain induced peripheral currents functioning inductively.

Referring now more particularly to FIG. 9, like numerals designate like parts. In this case one terminal 55 is formed with an extending disc 57. The other terminal is in the form of a disc 59. These are connected by an envelope 61, evacuated or infilled as above described in connection with envelope 43. The outside circuitry across terminals 55 and 59 is as already described. The fuel element 20 connects between terminal 55 and a conductive disc 17 from which rods 19 extend up in a connection with a ring 35. The conductive tube 39 extends down into connection with the terminal disc 59. Parts 20, 17, 19, 35, 39 form one current path between the terminals 55 and 59.

Extending up from the lower terminal 59 is an outermost conductive tube 65, at the upper end of which is connected a conductive upper ring 67. Located between tubes 19 and 65 is a lower conductive ring 69. This lower ring is carried by inner and outer triple sets of conductive coils 71 and 73, reversely wound relative to one another. The lower ends of these oppositely coiled sets of conductors are connected to the ring 69 as by welding, brazing, soldering or the like. As will appear, current flows serially through the coils of sets 71, 73. Consequently the current loops which they form have low impedance. The inner three conductive coils 71 are connected to and terminate at their upper ends on the disc portion 57 of the terminal 55. The outer three conductive coils 73 are connected to and terminate at their upper ends on the ring 67. The angular and axial spacings of the triple coils in each set 71 and 73 are made symmetrical (see FIG. 10). Thus there are three parallel-connected coils in each of the sets 71 and 73. This number is arbitrary and there may be more. The coils in each set 71, 73 are in parallel but the sets as wholes are in series-circuit relationship.

Upon the discharge of the electrical circuit shown in FIG. 9, there will occur two different flows of current (in electrical parallel) between the terminals 55 and 59. One flow occurs, as above stated, from terminal 55 down through the fuel element 20, up through the rods 19 and down through inside tube 39 to the other terminal 59. The operating effect of this current is the same as that already described in connection with FIG. 5. The other current path is from terminal 55, then down through the triple set of parallel-connected coils 71 to the conductor ring 69; then serially up through the triple set of parallel-connected coils 73 to ring 67; then down through the outer tube 65 to the terminal 59. It will be observed from FIG. 9 that the windings of the inner set of coils 71 are right-handed, whereas those of the outer coils 73 are left-handed. This opposed relationship may be reversed. Each coil has a surrounding magnetic field of force of skew form, but in view of the opposite coilings, the opposite axial components of these force fields are substantially balanced or offset. As a result, only substantially radial magnetic forces are produced by the sets of coils 71 and 73. Coils 71, 73 act as the primary of an inductive transformer of which the tube 39 is a secondary. The induced currents in the tube 39 are substantially purely peripheral. This peripheral flow of current in the tube 39 will induce a counterflow of peripheral current in the fuel container 21, 27. The associated magnetic field exerts additional compression on the fuel. In addition, the forms of the rods 19 are stabilized for a maximum period as they vaporize. Moreover, the magnetic field generated by the peripheral currents in the tube 39 tends to stabilize the coils 71 and 73 for a maximum period in their symmetrically helical forms as they vaporize. The use of symmetrical sets of coils such as 71 and 73 herein, in which the currents flow serially through the sets but in opposite directions, provides a stabilizing action which is superior to that of the types of coils described in my United States Patent 3,107,211.

Figure 11:
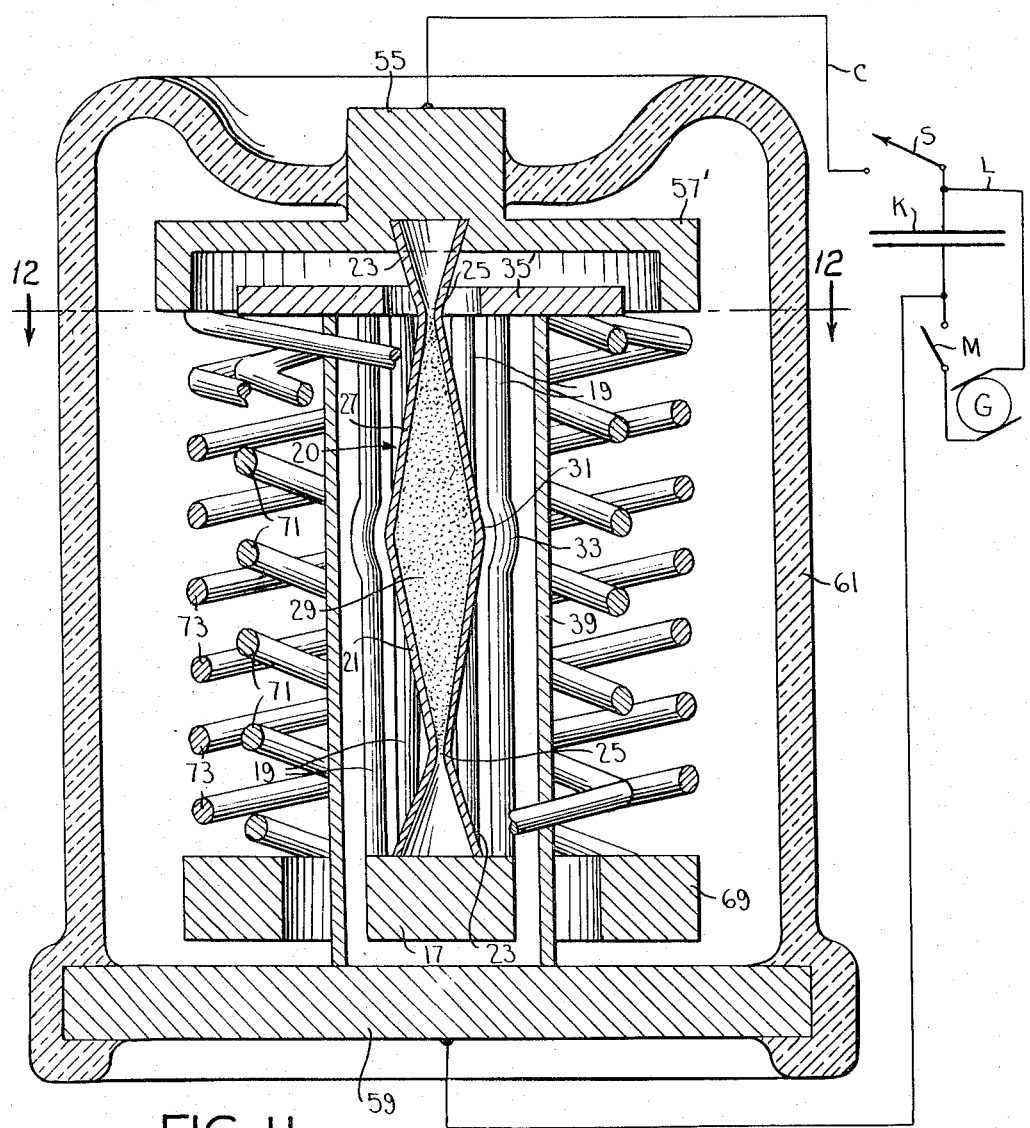
FIG. 11 is a view similar to FIG. 1, showing a fifth form of the apparatus.
Figure 12:
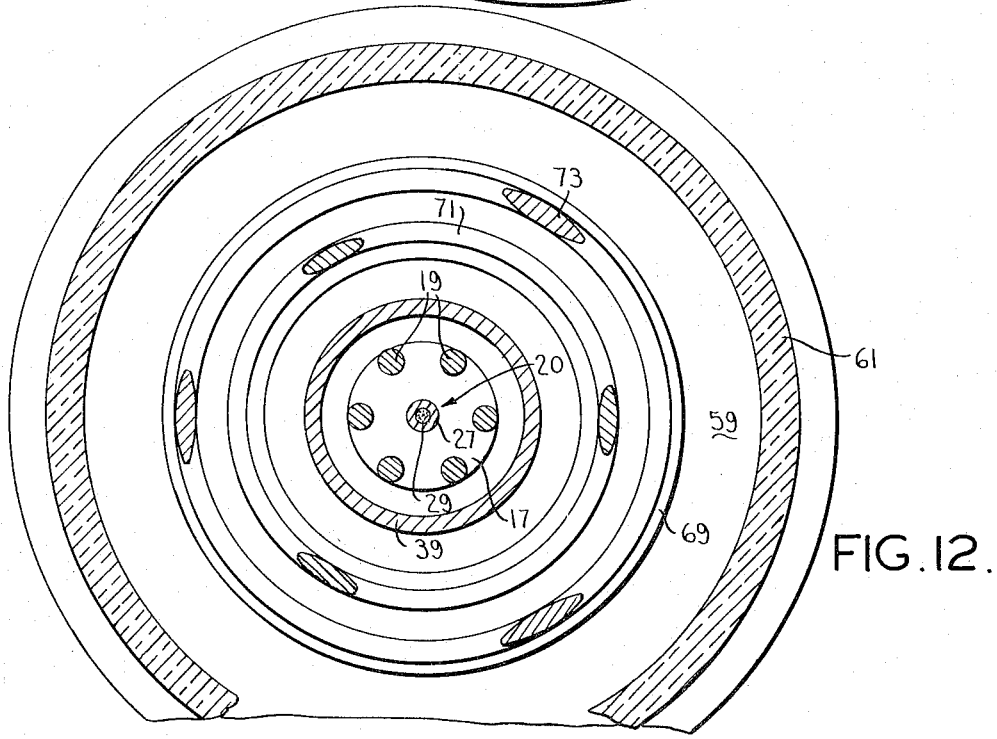
FIG. 12 is a cross section taken on line 12—12 of FIG. 11.

In FIGS. 11 and 12 is shown an arrangement similar to that shown in FIGS. 9 and 10 but in which the outside cylinder 65 shown in FIG. 9 is omitted. Like numerals designate like parts. In this case the upper terminal 55 is provided with a radial cup-shaped conductive extension 57', to the lower margin of which are connected the upper ends of the outer set of coils 73. The other ends of this set of coils are attached to the lower conductive ring 69. The inner set of coils 71 are also connected with the lower conductive ring 69. These coils 71 extend upwardly to the conductive ring 35', the latter corresponding to ring 35 in FIG. 9 and to which the rods 19 and cylinder 39 are attached. In this case one branch of the current flow occurs through the terminal 55, fuel element 20, block 17, up through the rods 19 to the ring 35, thence downwardly through the tube 39 to the terminal disc 59. The second branch current path occurs through the terminal 55, extension 57' of terminal 55, then down through the outer coils 73, ring 69, up through the inner coils 71 to the conductive ring 35' and then down through the cylinder 63 to the terminal disc 59.

From the above, it will be seen that a generic feature of all forms of the invention is the structure comprising the fuel cell 20 (preferably double-tapered) surrounded by the wires or rods 19 and connected in series-circuit relationship, the current flowing oppositely in the fuel cell and in these rods. A subgeneric feature of FIGS. 5–11 is the employment of the conductive sleeve 39 surrounding the wires or rods 19 and in which current flows in a direction opposite thereto. In FIG. 7 this arrangement is compounded by having a second set of rods and a tube surrounding them.

A subgeneric feature of the structure shown in FIGS. and 11 comprises the use of an additional circuit formed by the serially connected outer and inner oppositely and symmetrically arranged groups of coils. In FIG. 9, current from these serially connected coils to the terminal disc 59 is carried through the outer tube 65. In FIG. 11, current from these serially connected coils returns to the terminal disc 59 through the tube 39.

It will be understood that the alternative shapes of the fuel cell and of the rods or wires as shown in FIGS. 3 and 4 are applicable to the forms of the invention shown in FIGS. 5–12.

In the following claims, the phrase "fuel element" has reference to the entire assembly 20 constituted by the shell portions 21, 27 and the contents 29. The phrase "plane loop circuit" has reference to the arrangement between each respective rod such as 19, 19A or 19' and the central fuel element, which carry current oppositely in a radial plane only. The term "energy storage circuit" means one having the ability to release electrical energy in a heavy surge. As regards the materials of which the various parts are made, they are the same for parts serving analogous functions in the various forms of the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus of the class described, comprising an energy storage and discharge circuit, a conductive fuel-containing element symmetrically shaped around a straight axis, an array of discrete nonhelical conductors of substantially identical shapes symmetrically disposed around the fuel element, adjacent ends of the fuel element and of the conductors being connected to form symmetrically disposed radially plane loop circuits, means connecting the other end of the fuel element to one side of said circuit, means for connecting the other ends of all of the conductors to the other side of said circuit, means for releasing a surge of current from the circuit through the connecting means for parallel flows through the conductors and serial flows through each conductor and the fuel element sufficient to vaporize the fuel element including its fuel and the conductors to form plasma, the directional flow of current through each conductor and its resulting plasma being opposite to the flow of current through the fuel element and its plasma, whereby a magnetic pinch effect is exerted upon the fuel in its plasma form.

2. Apparatus according to claim 1, wherein the fuel-containing element is symmetrically tapered down in opposite directions along said axis.

3. Apparatus according to claim 1, wherein the fuel-containing element is symmetrically tapered down in opposite directions along said axis and the lengths of said conductors substantially follow the tapered form of the fuel-containing element.

4. Apparatus according to claim 1, wherein said conductors are of ribbon forms, the flatwise extents of which are substantially in axially disposed radial planes.

5. Apparatus of the class described, comprising an energy storage and discharge circuit, a conductive fuel-containing element symmetrically shaped around a straight axis, an array of discrete nonhelical conductors of substantially identical shapes symmetrically disposed around the fuel element, adjacent ends of the fuel element and of the conductors being connected to form symmetrically disposed radially plane loop circuits, means connecting the other end of the fuel element to one side of said circuit, a cylinder surrounding the conductors and connecting other ends of all of them to the other side of said circuit, means for releasing a surge of current from the circuit through the connecting means for parallel flows through the conductors and serial flows through the fuel element, the cylinder and each conductor sufficient to vaporize the conductors, the cylinder and the fuel element including its fuel to form plasma, the directional flow of current through each conductor and its resulting plasma being opposite to the flow of current through the fuel element and the cylinder.

6. Apparatus according to claim 5, wherein the fuel-containing element is symmetrically tapered down in opposite directions along said axis.

7. Apparatus according to claim 5, wherein the fuel-containing element is symmetrically tapered down in opposite directions along said axis and the lengths of said conductors substantially follow the tapered form of the fuel-containing element.

8. Apparatus according to claim 5, wherein said conductors are of ribbon forms, the flatwise extents of which are substantially in axially disposed radial planes.

9. Apparatus of the class described, comprising an energy storage and discharge circuit, a conductive fuel-containing element symmetrically shaped around a straight axis, a first terminal connected with said circuit and to one end of the fuel element, a second terminal adjacent the other end of the fuel element and connected with said circuit, first and second conductive members adjacent the first end of the fuel element, a third conductive member connected to the other end of the fuel element, a fourth conductive member adjacent said third conductive member, a first array of discrete nonhelical conductors of substantially identical shapes symmetrically disposed around the fuel element and connecting the third conductive member with the first conductive member, a first cylinder connecting said first conductive member with the fourth conductive member and surrounding said first array of conductors, a second array of discrete nonhelical conductors of substantially identical shapes symmetrically disposed around said first cylinder and connecting the second and fourth conductive members, and a second cylinder connecting the second conductive member with said second terminal and surrounding said second array of conductors.

10. Apparatus of the class described, comprising an energy storage and release circuit, first and second terminals connected with said circuit, first and second means forming first and second parallel-connected current paths, said first path comprising a fuel-containing element symmetrically shaped around a straight axis and connected at a first end to the first terminal, said second terminal being adjacent the second end of the fuel element, a first conductive member connected with said second end of the fuel element, a second conductive member adjacent the first end of the fuel element, an array of discrete nonhelical conductors with substantially identical shapes symmetrically disposed around the fuel element and connecting said first and second conductive members, a cylinder connecting said second conductive member with said second terminal, said second current path comprising serially connected oppositely wound symmetrically disposed coils surrounding said cylinder connected at one end to said first terminal, and means for connecting the other end of said serially connected coils with the second terminal.

11. Apparatus according to claim 10, wherein said last-named connecting means is constituted by said cylinder.

12. Apparatus according to claim 10, wherein said last-named connecting means is in the form of an additional conductive cylinder surrounding the coils.

13. Apparatus of the class described, comprising a fuel element symmetrically shaped around a straight axis, an array of discrete nonhelical conductors of substantially identical shapes symmetrically disposed around the fuel element, adjacent ends of the fuel element and of the conductors being connected to form symmetrically disposed radially plane loop circuits, a terminal connected at the other end of the fuel element, a terminal connecting the other ends of the conductors, an energy storage circuit connected across said terminals, and means for releasing a surge of current from the circuit through the terminals for parallel flows through the conductors and serial flows through each conductor and the fuel element to vaporize the fuel element and conductors to form plasma, the flow of current through each conductor and its plasma being opposite to the serial flow of current through the fuel element and its plasma.

14. Apparatus of the class described, comprising a fuel element symmetrically formed around a straight axis, at least one array of discrete conductors disposed around the fuel element, each conductor being of the same shape as the others and lying exclusively in a radial plane containing said axis, said planes being disposed equiangularly about said axis, adjacent ends of the fuel element and the conductors being connected to form symmetrically disposed radial plane loop circuits extending radially from said axis, a terminal connected at the other end of the fuel element, a terminal connecting the other ends of the conductors, an energy storage circuit connected across said terminals, and means for releasing a surge of current from the circuit through the terminals to vaporize the fuel element and conductors with parallel flows through the conductors, and serially through each conductor and the fuel element, whereby a pinched plasma is formed from the fuel and magnetic fields are induced through the loop circuits to exert a compressive stabilizing effect upon the evaporized fuel in its pinched plasma state.

15. Apparatus made according to claim 14, wherein said conductors are composed of material having a comparatively high atomic number, said fuel element having a containing shell for the fuel, said shell also having a comparatively high atomic number, and the fuel having a comparatively low atomic number.

16. Apparatus made acording to claim 15, wherein said fuel is lithium hydride.

17. Apparatus made according to claim 15, wherein each of said conductors and said shell is composed of a material selected from the group consisting of gold, silver and copper, and wherein the fuel is selected from the group consisting of lithium hydride and a half-and-half mixture by volume of tritium and deuterium gases under pressure.

18. Apparatus made according to claim 15, including a sealed container around the fuel element and the conductors containing a high vacuum.

19. Apparatus made according to claim 14, including a sealed container around the fuel element and the conductors containing air at several atmospheres of pressure.

20. Apparatus made according to claim 15, including an infilling of the space around the fuel element and the conductors composed of material selected from the group consisting of compressed magnesium powder, tetrafluoroethylene polymer, water and air at a pressure of several atmospheres.

21. Apparatus made according to claim 14, wherein said conductors and said shell are composed of gold and said fuel is a material selected from the group consisting of lithium hydride and a mixture of tritium and deuterium gases under pressure.

22. Apparatus made according to claim 14, wherein said fuel element has a containing shell for the fuel, said shell being composed of glass having a vapor-deposited thin film of material on at least one surface selected from the group consisting of lithium and beryllium.

23. Apparatus of the class described, comprising a conductive fuel cell having a central bulged portion and symmetrical tapering extensions therefrom, said cell being symmetrically formed around a straight axis, fuel in the cell, at least one array of at least five discrete conductors disposed around said cell, each conductor being of the same shape as the others and lying exclusively in a radial plane containing said axis, said planes being disposed equiangularly about said axis, adjacent ends of the fuel cell and the conductors being connected to form symmetrically disposed radial plane loop circuits extending radially from said axis, a terminal connected at the other end of the cell, a terminal connecting the other ends of the conductors, an energy storage circuit connected across said terminals, and means for releasing a surge of current from the circuit through the terminals to vaporize the cell with its contained fuel and the conductors to form plasma with parallel flows through the conductors and serially through each conductor and the cell with its fuel, whereby the magnetic fields induced exert a compressive pinch effect upon the vaporized fuel, said pinch effect being stabilized against any kinks which might tend to form in the plasma.

24. Apparatus according to claim 23, wherein the cell has flared portions terminating said tapered extensions to form the connections of the cell with said terminals.

25. Apparatus according to claim 24, wherein said conductors and cell are composed of gold.

26. Apparatus according to claim 23, including a sealed enclosure enveloping said conductors and the cell, said enclosure containing an insulating medium surrounding the cell and the conductors respectively.

27. Apparatus according to claim 23, wherein the cell is composed of glass having a conductive coating on at least one of its surfaces, and an insulating medium surrounding the cell and the conductors respectively.

28. A high-pressure and -temperature generator, comprising electrically insulated conductive terminals, a conductive fuel element attached at one of its ends to one of said terminals and extending in a certain direction therefrom, said fuel element being symmetrically formed about a center line, a number of identical conductors one end of each of which is attached to the other terminal and extending therefrom in the same direction and being in the form of a close array, said array being symmetrically disposed around said fuel element and center line, conductive connection symmetrically disposed around said center line and electrically connecting the other end of said fuel element with the other ends of said array of said conductors, thereby through said connection placing said fuel element in series-circuit relationship with said conductors between said terminals, and a circuit connected across said terminals and including a capacitor for surging current serially but in opposite directions through the fuel element on the one hand and said array of conductors on the other hand.

29. A high-pressure and -temperature generator, comprising electrically conductive terminals symmetrically disposed around a center line and supported by an insulating container symmetrically disposed around said center line, a conductive fuel element attached at one of its ends to one of said terminals and extending in one direction therefrom within the container, said fuel element being symmetrically formed about said center line, a number of identical conductors one end of each of which is attached to the other terminal and extending therefrom in the same direction within the container and being in the form of a close array, said array being symmetrically disposed to form a symmetrical cage around said fuel element and said center line, a conductive connection within the container symmetrically disposed around said center line and electrically connecting the other end of said fuel element with the other ends of said array of said conductors, thereby through said connection placing said fuel element in series-circuit relationship with said conductors between said terminals, a circuit connected across said terminals and including a capacitor for surging heavy current serially but in opposite directions through the fuel element on the one hand and said array of conductors on the other hand to convert said fuel element and conductors into plasmas.

30. A generator according to claim 29, wherein said fuel element has an enlarged waist and is symmetrically formed along said center line on opposite sides of the waist within the cage to cause a shaped charge effect along said center line as the plasmas are generated.

31. A generator according to claim 29, wherein each of said identical conductors is of circular cross section.

32. A generator according to claim 30, wherein each of said identical conductors has straight sections joined by an outwardly curved portion adjacent said waist.

33. A generator according to claim 32, wherein the cross section of each conductor is circular.

34. A generator according to claim 32, wherein the cross sections of the conductors are of rectangular ribbon-like, forms, the planes of which include said center line.

35. Apparatus of the class described, comprising a symmetrical fuel container disposed around an axis and converging toward its opposite ends, an array of nonhelical conductors symmetrically disposed around the container, an energy storage and releasing circuit including terminals, and means forming connections between said terminals, the fuel container and the conductors to provide for current flow from one terminal to the other through low-impedance loops established between the container and said array of conductors.

36. Apparatus of the class described, comprising a fuel container symmetrically disposed around an axis and converging symmetrically toward its opposite ends, an array of nonhelical conductors symmetrically disposed around the container, a conductive tube symmetrically disposed around said array of conductors, an energy storage and releasing circuit including terminals, and means forming connections between said terminals, the fuel container, the conductors and the tube to provide for current flow from one terminal to the other through low-impedance loops established between the container and array of conductors and low-impedance loops established between said array of conductors and the tube.

37. Apparatus of the class described, comprising a fuel container symmetrically disposed around an axis and converging symmetrically toward its opposite ends, a first array of nonhelical conductors symmetrically disposed around the container, a first conductive tube symmetrically disposed around said first array of conductors, a second array of nonhelical conductors symmetrically disposed around said first tube, a second tube symmetrically disposed around said second array of conductors, an energy storage and releasing circuit including terminals, and means forming connections between said terminals, the fuel container, the arrays of conductors and the tubes to provide a flow of current from one terminal to the other through low-impedance loops established between the container and first array of conductors, low-impedance loops established between the first tube and said first array of conductors, low-impedance loops established between the second array of conductors and the first tube, and low-impedance loops established between the second tube and said second array of conductors.

38. Apparatus of the class described, comprising a fuel container symmetrically disposed around an axis and converging symmetrically toward its opposite ends, an array of nonhelical conductors symmetrically disposed around the container, a conductive tube symmetrically disposed around said first array of conductors, an energy storage and releasing circuit including terminals, means forming connections between said terminals, the fuel container, the conductors and tube to provide for a first current flow from one terminal to the other through low-impedance loops established between the container and said array of conductors and low-impedance loops established between the tube and said array of rods, inner and outer oppositely coiled and serially connected conductor windings disposed around said tube, a second conductive tube symmetrically disposed around said conductor windings, and means forming connections between said terminals, said inner and outer conductor windings and said second tube to provide for a second current flow from one terminal to the other serially through the coils.

References Cited by the Examiner

UNITED STATES PATENTS 3,107,211   10/1963   Mallinckrodt _____ 176—1

REUBEN EPSTEIN, *Primary Examiner.*